J. R. BRUCE.
SIDE CAR ATTACHMENT FOR MOTOR CYCLES.
APPLICATION FILED JUNE 19, 1914.

1,130,061.

Patented Mar. 2, 1915.

Witnesses:
W. E. Freeman,
J. F. Beeler

Inventor:
John R. Bruce,
By Hiram B. Swartz
Atty.

UNITED STATES PATENT OFFICE.

JOHN R. BRUCE, OF WOOSTER, OHIO.

SIDE-CAR ATTACHMENT FOR MOTOR-CYCLES.

1,130,061.        Specification of Letters Patent.      Patented Mar. 2, 1915.

Application filed June 19, 1914. Serial No. 846,204.

*To all whom it may concern:*

Be it known that I, JOHN R. BRUCE, a citizen of the United States, residing at Wooster, in the county of Wayne and State of Ohio, have invented a new and useful Side-Car Attachment for Motor-Cycles, of which the following is a specification.

My invention relates to improvements in side-cars for motorcycles; its object is to provide improved means for making the side-car flexible upon the motorcycle and diminishing its side draft, and in a manner comparatively inexpensive.

It consists, primarily, of the arrangement of a pair of rods diagonally between the motorcycle frame and the bed frame of the side-car, said rods being adapted to yield longitudinally in both directions, whereby the side-car may move a limited distance up and down, independently of the relative position of the motorcycle.

It further consists of means for flexibly securing the side-car to the motorcycle frame in such a manner as to reduce the side draft of the side-car to a minimum, all as hereinafter fully set forth and as stated in the appended claims.

My invention is illustrated by the accompanying drawings, in which similar letters of reference indicate like parts.

Figure 1:
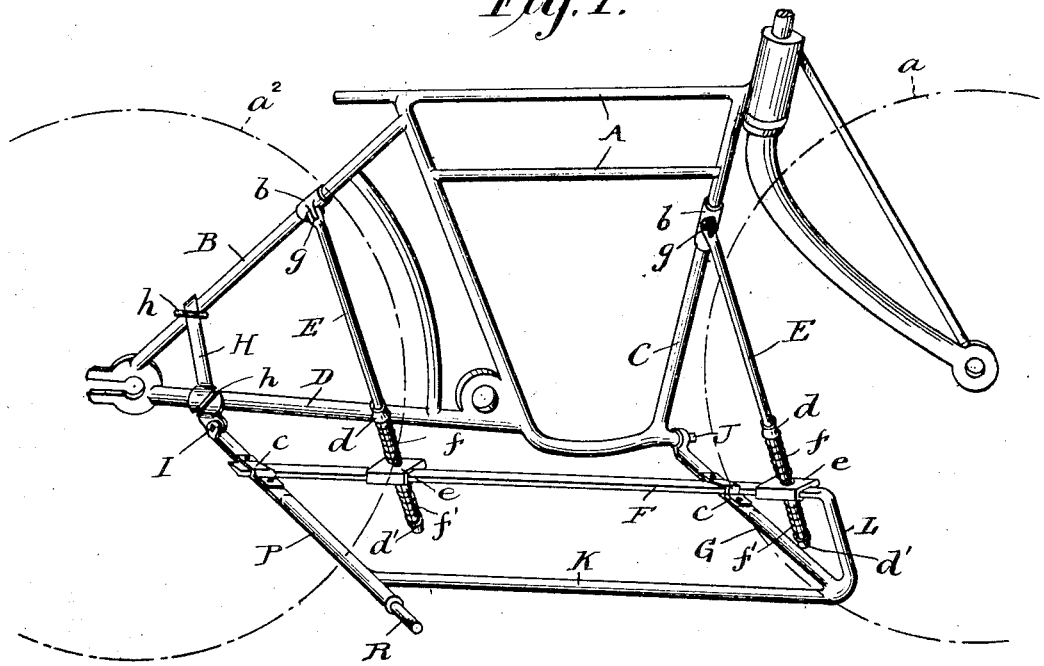
Figure 2:
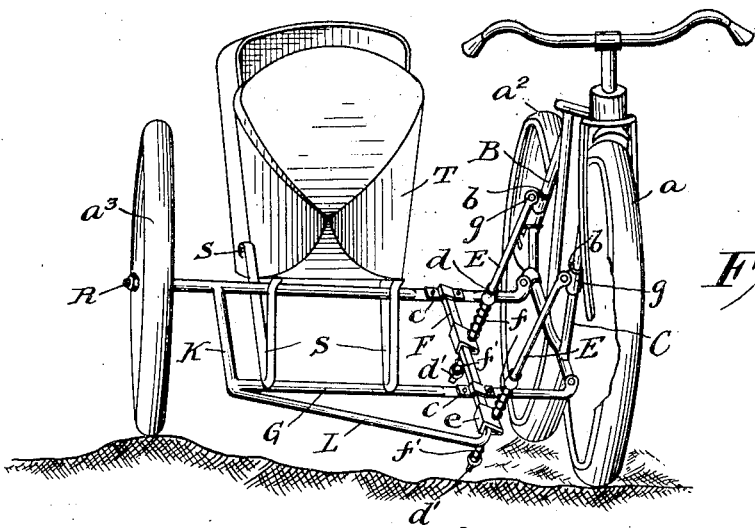
Figure 3:
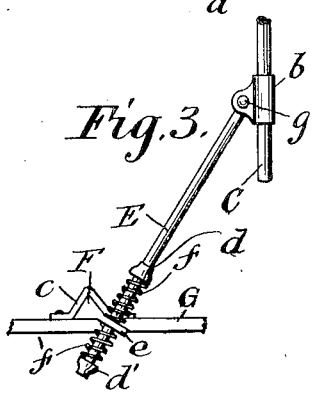

Referring thereto, Figure 1 is a side view of the motorcycle and side-car frames and connecting means, the side-car body and motorcycle mechanism being removed. Fig. 2 is a front view of a motorcycle and side-car attached, embodying my invention, the front wheel being partly broken away for better illustration of the side-car supporting means. Fig. 3 is a detailed view of one of my diagonal rods and its connections, detached.

In the drawings, the cars A, B, C, D constitute the frame work of a motorcycle, such as commonly used. The bars P, K, F, G and L constitute the bed frame of my side-car attachment. The bar P forms the axle of the side-car which is supported outwardly by the wheel $a^3$. Said bar is hinged to the motorcycle frame in connection with the metal strip H which is secured to the bars B, D by clips $h$ $h$ near the axle of the rear wheel $a^2$ of the motorcycle, the hinge connection I being located below the bar D and as close to said rear wheel as possible. The forward end of the side-car frame is hinged to the forward end of the motorcycle frame by a hinge connection J at the end of the bar G just back of the front wheel $a$ of the motorcycle, and at, or slightly beyond the center of gravity of the motorcycle frame sufficient to relieve the same of all side draft thereon from the weight of the said side-car frame. The bars K and L of said frame are solidly connected together and to said hinged members G and P, and a longitudinal bar F, preferably of an angular shape, is rigidly secured across said frame by suitable clip fastenings $c$ $c$, and to said bar L, substantially as shown in Fig. 1. Upon said bar F are firmly secured a pair of clips $e$ $e$, which are set at a proper angle and bored to receive the adjacent ends of the diagonal rods E E and permit the same to freely move longitudinally therein at one side of said bar F. Said rods E are respectively hinged at their upper ends to said motorcycle frame members B and C by hinge connections $o$ $g$, substantially as shown in Fig. 1, and extend diagonally downwardly therefrom through said clips $e$ $e$, as aforesaid, and have a limited movement therein resiliently in both directions longitudinally by means of coiled springs $f$ $f'$ mounted thereon between the collars $d$ $d'$ on said rods, and the opposing faces of said clips $e$ $e$, as abutments for said springs, respectively. It is apparent that said diagonal rods will serve as braces to support said motorcycle in upright position at all times, and will also afford resilient resistance, by means of said springs, to the vertical movement of the free end of said side-car frame sufficient to permit its wheel $a^3$ to pass freely over irregular surfaces without tilting the motorcycle sidewise.

The side-car body T may be of the usual form and construction, and supported on springs of any desired pattern. The angular form of the bar F may be modified to any other which will hold the clips $e$ $e$ solidly in the required angular position thereon to serve as abutments for the spiral springs $f$ $f'$, as aforesaid. It is also apparent that a side-car of any desired form may be, by the means aforesaid, flexibly attached to any motorcycle such as now commonly used, at trifling expense.

I am aware it is not new to construct a flexible side-car, and such I do not broadly claim.

My improvement lies in the novel means employed for the purpose, as more simple and inexpensive, and less liable to get out of order, and for hinging the side-car so as to hang nearer the center of gravity of the motorcycle than heretofore, whereby side draft is eliminated.

I do not limit myself to mere details of construction, but

Having thus fully described my invention what I claim and desire to secure is—

1. In a device of the character described, the combination with the frame of a motorcycle and bed frame of a side-car therefor hinged to the latter, a rigid longitudinal support bar on said bed frame having clip abutments mounted thereon and projecting sidewise at an angle; diagonal rods hinged to said motorcycle frame and extended downwardly through said clip abutments respectively; abutments on said diagonal rods both above and below said clip abutments, and spiral springs mounted on said rods between said several abutments to limit resiliently the longitudinal movement of said rods, substantially as set forth.

2. In a device of the character described, the combination with the frame of a motorcycle and bed frame of a side car hinged thereto; one or more diagonal rods hinged to said motorcycle frame and extended downwardly to engage corresponding abutments in said bed frame—said rods extending through said abutments, and having abutments thereon above and below said bed frame abutments, and spiral springs on said rods between said several abutments, substantially as set forth, and for the purpose specified.

In witness whereof, I hereunto set my hand this 4th day of April A. D. 1914.

JOHN R. BRUCE.

In presence of—
 CHARLES C. JONES,
 HIRAM B. SWARTZ.